Jan. 4, 1944.   G. F. NADEAU ET AL   2,338,664

SHEET MATERIAL, PARTICULARLY PHOTOGRAPHIC FILM

Filed Aug. 1, 1940

FIG.1.

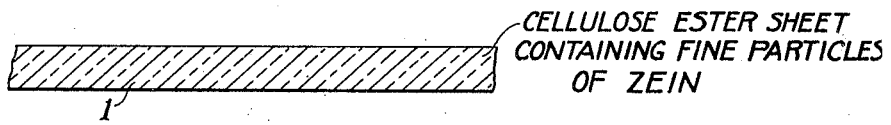

CELLULOSE ESTER SHEET CONTAINING FINE PARTICLES OF ZEIN

FIG.2.

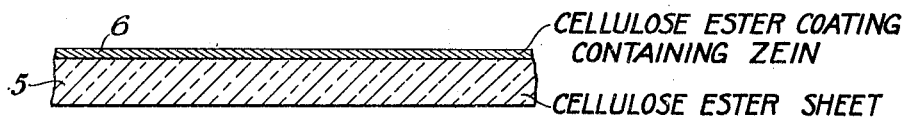

CELLULOSE ESTER COATING CONTAINING ZEIN
CELLULOSE ESTER SHEET

FIG.3.

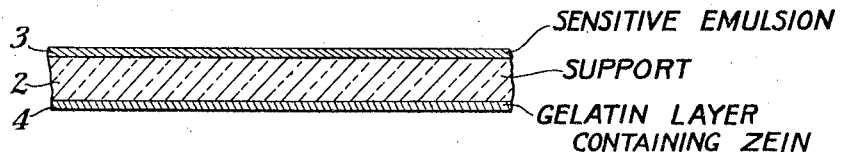

SENSITIVE EMULSION
SUPPORT
GELATIN LAYER CONTAINING ZEIN

FIG.4.

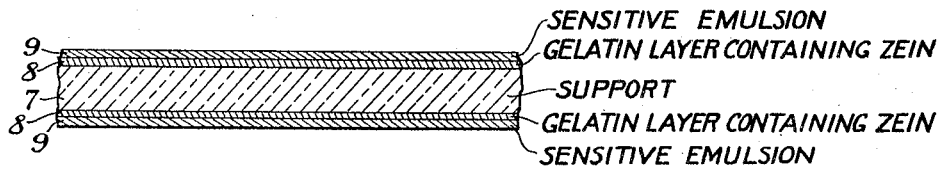

SENSITIVE EMULSION
GELATIN LAYER CONTAINING ZEIN
SUPPORT
GELATIN LAYER CONTAINING ZEIN
SENSITIVE EMULSION

FIG.5.

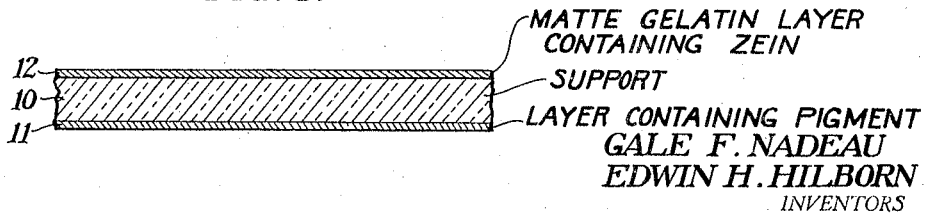

MATTE GELATIN LAYER CONTAINING ZEIN
SUPPORT
LAYER CONTAINING PIGMENT

GALE F. NADEAU
EDWIN H. HILBORN
INVENTORS

BY Newton M. Perrins
ATTORNEY

Patented Jan. 4, 1944

2,338,664

UNITED STATES PATENT OFFICE 2,338,664

SHEET MATERIAL, PARTICULARLY PHOTOGRAPHIC FILM

Gale F. Nadeau and Edwin H. Hilborn, Rochester, N. Y., assignors to Eastman Kodak Company, Rochester, N. Y., a corporation of New Jersey Application August 1, 1940, Serial No. 349,346

9 Claims. (Cl. 95—9)

This invention relates to the use of a prolamine, particularly zein, in the form of finely dispersed particles to prevent static in sheet material or to render the sheet material light diffusing or matte. It may be used with thin sheeting, e. g., cellulose acetate sheeting, where it is particularly useful in the prevention of static; or with photographic film as in the manner described in the United States patent application, Serial No. 330,132, filed April 17, 1940, now Patent No. 2,322,037, of June 15, 1943, by Carl G. Lindquist, wherein is described the use of a very small amount of finely divided particles to prevent static, lessen abrasion marks, and accomplish other desirable results. It may also be used in larger proportions to render visibly rough or matte the surface of a photographic emulsion, to render the support of a photographic film light diffusing or to render light diffusing or matte a non-sensitive gelatine layer on the back of a photographic film. It may also be used to render light diffusing a translucent screen or sheet such as may be used in place of ground glass for focusing a camera or as a light transmitting projection screen. It may also be used in a gelatine layer applied to a sheet of polarizing material to constitute a screen through which a diffuse beam of polarized light may be obtained.

Our invention consists specifically, in the use of zein or other prolamine for the various purposes mentioned above, for which other materials have been proposed, to render a sheet, which may or may not have a photographically sensitive layer, anti-static, matte or light diffusing. Among the materials which have been used heretofore for such purposes are ground glass, silica, starch, titanium and other oxides, resins in the form of fine particles, pigments and various crystals.

Zein accomplishes the useful purposes attained by these materials and does not tend to settle out rapidly from the coating solution so that a uniform dispersion is obtained. It is stable in solutions of cellulose esters. Its refractive index is of the same order as that of gelatine. It is inert toward photographic emulsions and not soluble or removable in photographic baths. Its compatibility with photographic emulsions is an outstanding advantage.

We have found zein particularly adapted to the purposes set forth because of its unique solubility as compared to other proteins. The prolamines, of which zein is the most common member, possess the distinction among proteins of being insoluble both in water and in alcohols. They are, however, soluble in mixtures of alcohols and water. This solubility characteristic imparts to the prolamines a tendency to swell in either aqueous or alcoholic solvents, which, in turn, makes it possible to obtain stable dispersions in these solvent mixtures. For example, gelatine is soluble in water and, as a result, has definite disadvantages as a surface coating material because of its high moisture susceptibility. It is insoluble in certain other solvents, in which it is difficult to obtain a stable dispersion of it. These properties of gelatine are shared to a greater or less degree by other proteins.

A disadvantage with certain resins which have been suggested for similar purposes is that they are thermoplastic and surfaces in which they are used tend to stick to heated parts of machines through which they may pass. These resins also have a high water resistance tending to cause poor adhesion of layers in which they are used. Zein is intermediate between materials of this type and gelatin in its susceptibility to water.

Further advantages of zein over certain other matting materials lie in the ease with which controlled degrees of dispersion can be realized. Zein can be dissolved in solvents and the solution poured into nonsolvents, causing a precipitation of the zein. By known methods of control, various degrees of dispersion and stability of the final material may be obtained. Matte coatings, wherein zein and a cellulose ester are mixed, may be made from mixtures such as those hereinafter designated Formulae I and II containing a higher boiling non-solvent for zein. When this is coated, the active zein solvent evaporates, causing a precipitation of the zein in the cellulose ester and yielding a matte layer. Since the zein is in solution in the mixture, no troubles arise from settling. This simplifies the technical aspects of making the matte surface in a way which is not possible with solid undissolved particles such as ground glass, silica, titanium and other oxides and pigments.

Zein appears to have no important disadvantages for any of the uses mentioned.

Referring to the accompanying drawing, the various figures are cross sections on an enlarged scale of various sheet materials embodying our invention.

Figure 1 shows a sheet of cellulose ester composition in which are dispersed fine particles of zein.

Figure 2 shows a sheet having a coating containing zein applied to it.

Figure 3 shows a sheet on which is a front photographic layer and a rear layer containing particles of zein.

Figure 4 shows a photographic film or sheet having a sensitive layer on each surface with sub-layers containing zein.

Figure 5 shows an unsensitized sheet or film having an opaque or light obstructing layer on one surface and a matte layer containing zein on the other surface.

In the form shown in Figure 1, the zein is dispersed in the sheet 1 of cellulosic material.

It may be present in comparatively small quantities when the sheet is very thin and the purpose is merely to prevent static in the manner described in U. S. Patent Beach, No. 2,084,313, granted June 22, 1937; or it may be present in sufficient quantities to render the sheet light diffusing if the sheet is to be used in place of a focusing "ground glass" or as a light transmitting projection screen or any other purpose where a diffused beam is desired.

A typical formula, in which however, the proportion of zein may be widely varied, depending on the use to which the sheet is to be put, is the following; proportions being by weight:

FORMULA I

| | Per cent |
|---|---|
| Low viscosity cellulose acetate propionate | 10 |
| Zein | 2 |
| Water | 4 |
| Methyl Cellosolve | 20 |
| Methyl alcohol | 14 |
| Ethylene dichloride | 50 |

Elimination of the water and methyl Cellosolve lessens the roughness of the matte surface. Cellulose acetate butyrate and other cellulose esters may be used. The dispersion may be diluted with toluene, butyl acetate or both.

The above formula is stable and will dry down to a matte surface layer 6 when applied to cellulose ester sheeting 5, as shown in Fig. 2, or when coated to form itself the body of the sheeting as shown in Fig. 1.

A rougher surface can be produced if, for the coating solution used as in Fig. 2, butyl Cellosolve is used as the solvent. An example is the following:

FORMULA II

Solution A

| | Per cent |
|---|---|
| Zein | 5 |
| 95% ethyl alcohol | 75 |
| Distilled water | 18.5 |
| Butyl cellosolve | 1.5 |

Solution B

| | Per cent |
|---|---|
| Cellosolve acetate | 10 |
| 95% ethyl alcohol | 18 |
| Acetone | 72 |

One part by volume of solution A is added to part of solution B while stirring and the resultant mixture allowed to stand until it thickens to the consistency of a thin syrup. This would take some 4 or 5 hours. It is then applied to a cellulose acetate sheet and dried at a temperature of approximately 150° F.

A formula for use as a backing layer 4 for photographic film having a cellulose ester sheet or support 2 and a sensitive emulsion 3 is the following:

FORMULA III

| | Per cent |
|---|---|
| Gelatine | 2.0 |
| Zein | 0.2 |
| Saponin | 0.1 |
| Isopropyl alcohol | 2.0 |
| Water | 95.7 |

To this may be added a hardener for the gelatine. To change the rate of evaporation methyl alcohol may be added, proportions not being critical.

An example is shown in Fig. 4 wherein the transparent sheet or support 7 has coated upon each surface a sub-layer 8 having particles of zein or other prolamine dispersed therein and sensitive layers 9 coated upon these. Such an embodiment is particularly useful for X-ray purposes. Both sub-layers may be coated before either sensitive emulsion is applied and serve efficiently to prevent static during emulsion coating. The uncovered sublayer is effective to prevent or reduce static during the subsequent winding of the film and its unwinding again preparatory to the coating of the second emulsion layer. For this purpose, only a very small quantity of zein is necessary, not enough to render the film "visibly matte."

In Fig. 5, the support 10 has on one surface a pigment containing layer 11 of known type, which is opaque or light obstructing, and on the other surface a gelatin layer 12 containing zein in sufficient quantity to render the surface matte or toothed, so that it may be readily written upon with a lead pencil. This is useful, for instance, as a leader strip for amateur motion picture films. The user can write identifying legends on the matte surface and the pigmented layer prevents the projection of a dazzling light upon the projection screen.

Another formula found satisfactory for layer 12 is the following:

FORMULA IV

| | Per cent |
|---|---|
| Nitrocellulose | 2½ |
| Zein | 2 |
| Water | 5 |
| Methyl alcohol | 30½ |
| Amyl acetate | 60 |

It is to be understood that, in general, the layer containing zein may be the support, a sub-layer between the emulsion layer and the support, the emulsion layer itself or an overcoating layer over the sensitive emulsion. Anti-static or diffusing layers containing dispersed particles have been used in all of these positions and our invention comprises the use of zein in discrete particles of such fineness and amount as to accomplish the desired purpose. It is to be understood that the above embodiments are given by way of example and that we consider as included within our invention any modification or equivalents falling within the scope of the appended claims.

What we claim is:

1. Light transmitting sheet material comprising a support of a cellulose ester composition and a gelatine layer thereon in which particles of zein are dispersed.

2. A photographic film comprising a support of plastic material and a sensitive layer and including a gelatine layer in which particles of zein are dispersed.

3. Sheet material comprising a support of plastic material and including a gelatin layer in which particles of a prolamine are dispersed.

4. Sheet material comprising a support of plastic material and including a gelatin layer in which particles of zein are dispersed.

5. Sheet material comprising a support of a cellulose ester composition and a gelatin layer thereon in which particles of a prolamine are dispersed.

6. Sheet material comprising a support of a cellulose ester composition and a gelatin layer thereon in which particles of zein are dispersed.

7. A photographic film comprising a support of plastic material and a sensitive layer and including a gelatin layer in which particles of a prolamine are dispersed.

8. A photographic film comprising a support of a cellulose ester composition and a sensitive layer and including a gelatin layer in which particles of a prolamine are dispersed.

9. A photographic film comprising a support of a cellulose ester composition and a sensitive layer and including a gelatin layer in which particles of zein are dispersed.

GALE F. NADEAU.
EDWIN H. HILBORN.